United States Patent
Oakes (10) Patent No.: US 9,801,217 B2
(45) Date of Patent: Oct. 24, 2017

(54) METHOD FOR TETHERING A COMMUNICATIONS DEVICE

(71) Applicant: QUALCOMM Technologies International, Ltd., Cambridge (GB)

(72) Inventor: Ivan Oakes, Rangeworthy (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 0 days.

(21) Appl. No.: 14/725,250

(22) Filed: May 29, 2015

(65) Prior Publication Data

US 2016/0353497 A1    Dec. 1, 2016

(51) Int. Cl.
| | |
|---|---|
| *H04W 72/00* | (2009.01) |
| *H04W 76/02* | (2009.01) |
| *H04W 48/14* | (2009.01) |
| *H04W 72/04* | (2009.01) |
| *H04L 12/64* | (2006.01) |
| *H04W 88/04* | (2009.01) |
| *H04W 84/12* | (2009.01) |

(52) U.S. Cl.
CPC ....... *H04W 76/023* (2013.01); *H04L 12/6418* (2013.01); *H04W 48/14* (2013.01); *H04W 72/0453* (2013.01); *H04W 76/021* (2013.01); *H04W 88/04* (2013.01); *H04W 84/12* (2013.01)

(58) Field of Classification Search
CPC .................................................. H04W 84/12
USPC ..... 455/450, 426.1, 411, 457; 370/220, 338, 370/235, 331, 329, 315, 252, 242, 328
See application file for complete search history.

(56) References Cited

U.S. PATENT DOCUMENTS

| | | | | |
|---|---|---|---|---|
| 7,633,909 B1* | 12/2009 | Jones | ................. | H04L 63/0272 370/338 |
| 2011/0289186 A1 | 11/2011 | Bell et al. | | |
| 2013/0148568 A1* | 6/2013 | Iimori | ................. | H04W 40/02 370/315 |
| 2013/0297835 A1* | 11/2013 | Cho | ................. | H04M 1/72527 710/14 |
| 2013/0331028 A1 | 12/2013 | Kuehnel et al. | | |
| 2014/0206346 A1* | 7/2014 | Kiukkonen | ....... | H04W 52/0229 455/426.1 |
| 2015/0271813 A1* | 9/2015 | Kim | ..................... | H04L 5/0092 370/329 |

OTHER PUBLICATIONS

International Search Report and Written Opinion—PCT/EP2016/060069—ISA/EPO—dated Sep. 13, 2016—10 pages.

* cited by examiner

*Primary Examiner* — Kiet Doan
(74) *Attorney, Agent, or Firm* — Procopio, Cory, Hargreaves & Savitch LLP/Qualcomm (57) ABSTRACT

A method for tethering a communications device which is capable of providing access to a data network to a second device which requires access to the data network, includes configuring a WLAN subsystem of the communications device to act as a wireless station. The method further includes configuring a router subsystem of the communications device to route data received by the WLAN subsystem from the second device and intended for the data network to a cellular modem subsystem of the communications device, and to route data from the data network received by the cellular modem subsystem and intended for the second device to the WLAN subsystem.

23 Claims, 6 Drawing Sheets

METHOD FOR TETHERING A COMMUNICATIONS DEVICE

TECHNICAL FIELD

The present application relates to a method for tethering a communications device.

BACKGROUND TO THE INVENTION

The cellular data connectivity of mobile telephones and similar devices can be harnessed by other devices that do not have cellular data capabilities, such as personal computers (PCs), laptops and the like, by "tethering" the mobile telephone to the other device via a wired or wireless connection which enables the other device to make use of the mobile telephone's cellular data connectivity, for example to access the internet.

Figure 1:
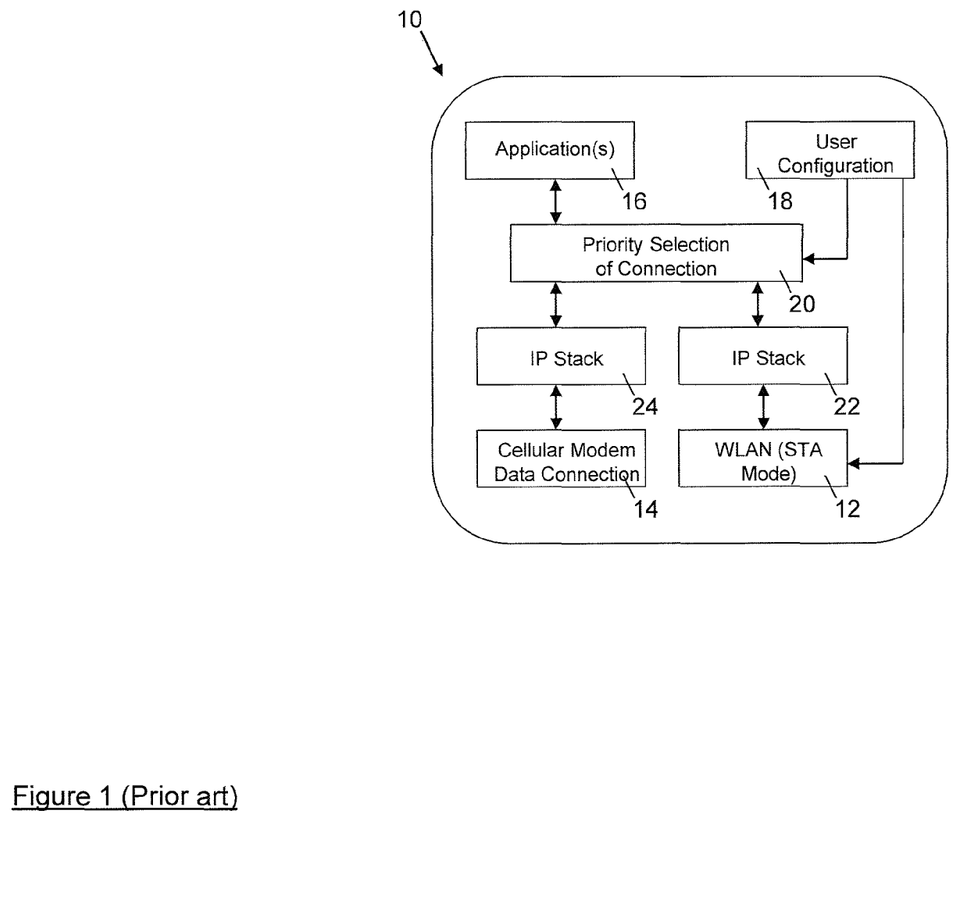
FIG. 1 is a schematic functional block diagram of a communications device operating as a wireless station.

FIG. 1 is a schematic functional block diagram of a communications device such as a mobile telephone. As can be seen from FIG. 1, the device 10 includes a WLAN (wireless local area network) sub-system 12, which in normal operation of the device 10 is configured to operate in a wireless station (STA) mode.

The device 10 also includes a cellular modem 14, by means of which the device can connect to a cellular telecommunications network. Applications 16 executing on the device can access the internet through either the cellular network via the cellular modem 14 or through a wireless (e.g. WiFi®) network via the WLAN sub-system 12, depending upon the available connections and upon user preferences defined in a user configuration 18. A connection selector 20 connects the applications 16 to either the WLAN sub-system 12 or the cellular modem 14 via a respective Internet Protocol (IP) stack 22, 24 to permit transfer of data between the internet and the applications 16 over either the cellular network or the wireless network.

Typically when a user wishes to use the data connectivity of a mobile telephone or similar device to access the internet using another device such as a personal computer, tablet computer or the like, the mobile telephone must be manually placed into a mode commonly called "Hotspot", "Personal Hotspot" or "Tethering" mode, and a connection must be established between the mobile telephone and the other device, typically by entering a password into one or both of the devices in response to a prompt.

Figure 2:
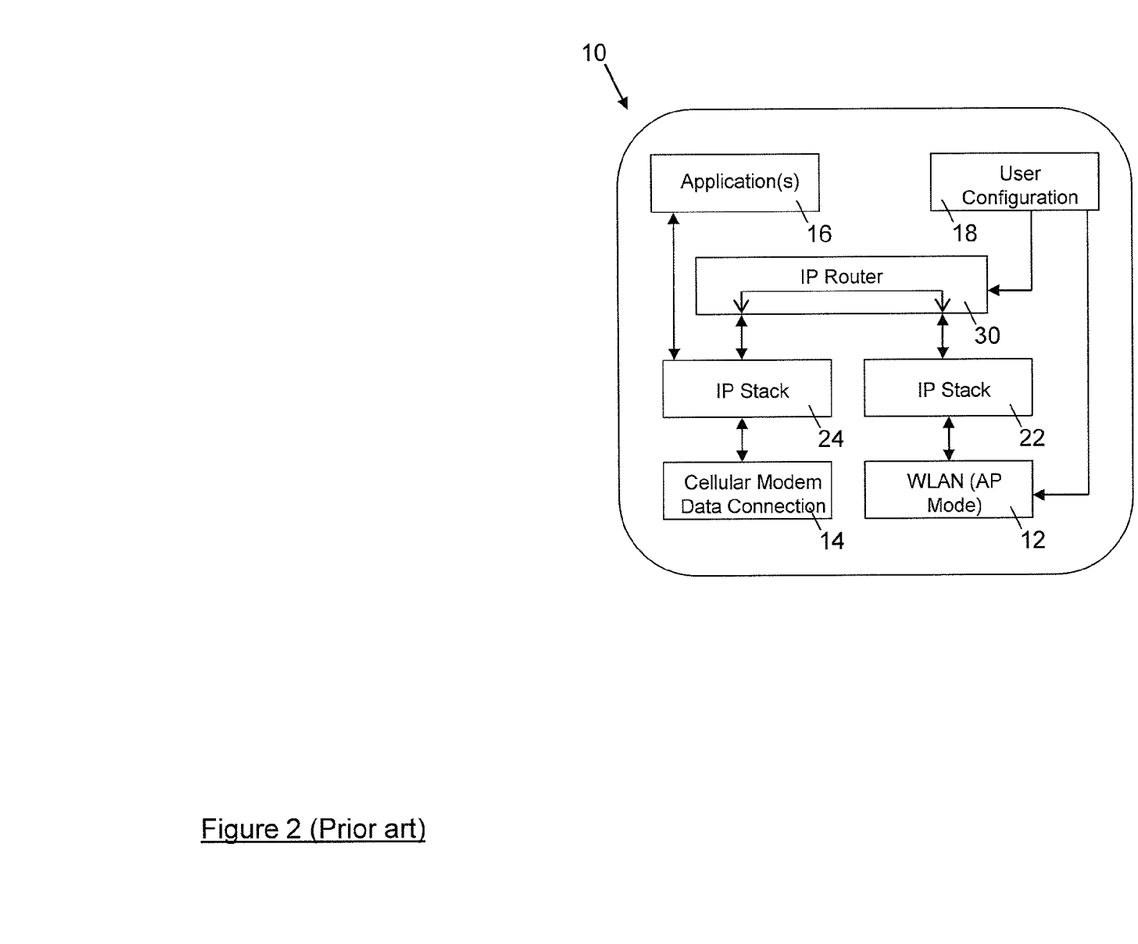
FIG. 2 is a schematic functional block diagram of a communications device operating in a tethering mode as a wireless access point.

FIG. 2 is a schematic functional block diagram of the communications device 10 of FIG. 1 configured for use in this tethering mode. In this mode, the WLAN subsystem 12 of the device 10 is placed into an Access Point (AP) mode and networking is set up within the device 10 through an IP router 30 of the device 10 to bridge data between the cellular modem 14 and the WLAN subsystem 12. The device 10 thus acts as a WLAN access point, and permits data flow between devices connected to this WLAN access point and the cellular network serving the device 10.

Figure 3:
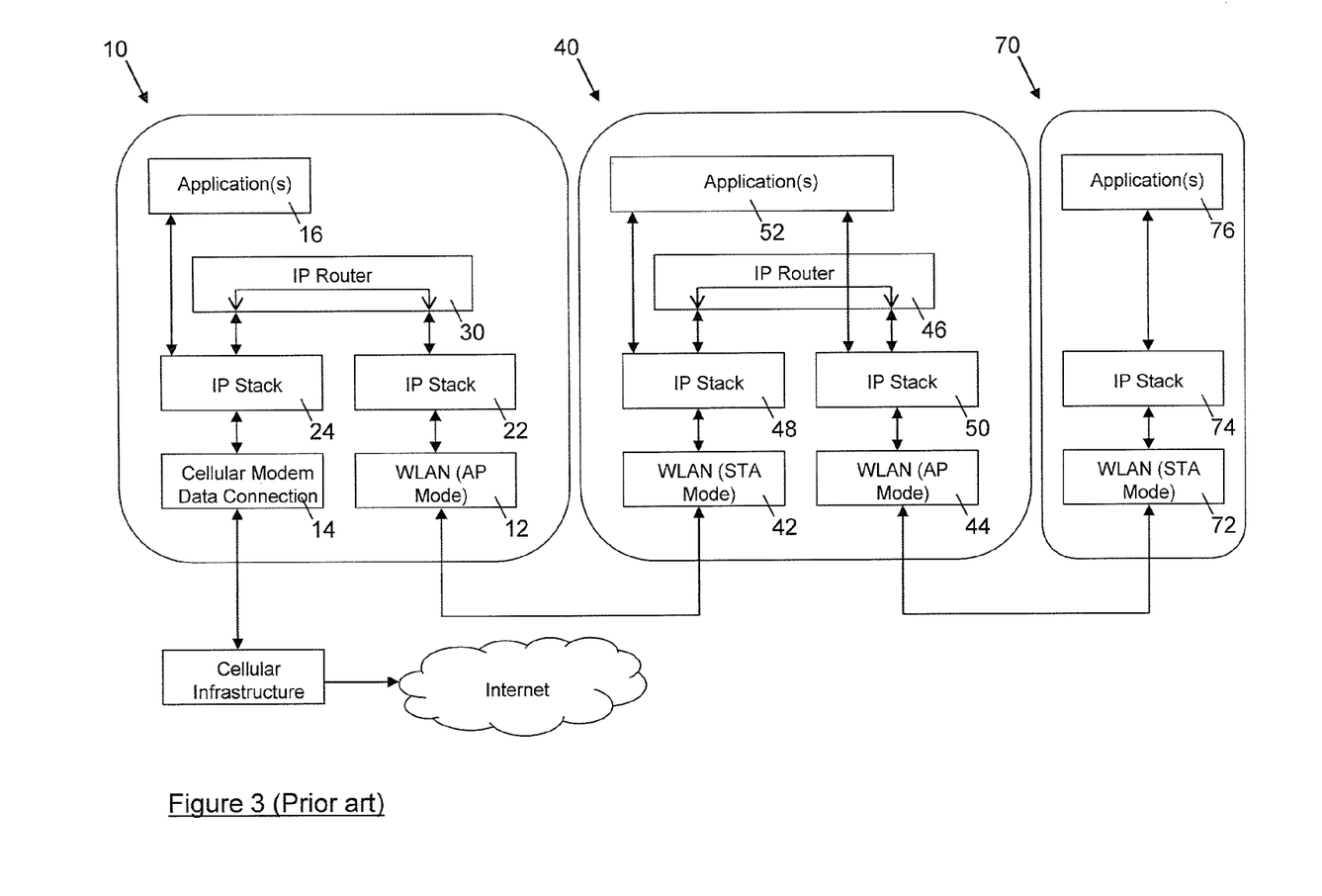
FIG. 3 is a schematic functional block diagram of a vehicle information and entertainment system tethered to a communications device.

One field in which use of such tethering is increasing is in vehicles. Vehicle information and entertainment systems increasingly offer users access to the internet, via a tethered mobile telephone or other device, as schematically illustrated in FIG. 3. In such systems a head unit 40 installed in the vehicle acts provides wireless connectivity and internet access (via the tethered device) for user devices such as personal computers and tablet computers within the vehicle.

In the system illustrated in FIG. 3, a device such as a user's device 10 is tethered to the head unit 40 as described above, to provide access to the internet via its cellular modem 14. Thus, when the mobile device 10 is tethered to the vehicle head unit 40, its WLAN subsystem 12 is configured to operate in AP mode to act as a wireless access point, permitting access to the internet by the head unit 40 and any other device (e.g. device 70) that is connected to the head unit 40.

In addition, the head unit 40 may also provide wireless connectivity for devices associated with the vehicle, such as parking sensors, reversing cameras, display screens and the like, to permit such devices to communicate with each other and with other systems of the vehicle.

To facilitate this dual connectivity, the head unit 40 includes two WLAN subsystems. A first WLAN subsystem 42 is configured to operate in STA mode to act as a wireless station (STA), communicating with the WLAN subsystem 12 of the tethered device 10 (which, as indicated above, is configured to operate in AP mode to act as a wireless access point). A second WLAN subsystem is configured to operate in AP mode to act as a wireless access point, and to communicate with other devices 70 within the vehicle. An IP router function 46 of the head unit 40 is configured to bridge IP data between the other devices 70 and the tethered device 10, via IP stacks 48, 50, to permit internet connectivity for the other devices 70 via the cellular modem 14 of the tethered device 10.

The tethering method and system described above with reference to FIGS. 1 to 3 suffers from a number of disadvantages. Firstly, as described above, the user must manually configure the device 10 to operate in its tethering mode, and must manually configure the head unit 40 to connect to the device 10. As well as being tedious and time-consuming, in automotive applications of the kind described above there is an additional safety concern, as manually setting the device 10 to the tethering mode and connecting it to the head unit 40 of the vehicle may distract the driver's attention from the road.

Additionally, when the WLAN subsystem 12 of the device 10 is in the AP mode, it must be permanently on, which consumes a large amount of power compared to when the WLAN subsystem 12 operates in STA mode. As will be appreciated, this has a detrimental effect on the battery life of the device 10.

Accordingly, a need exists for an improved method of tethering a device such as a mobile telephone to another device to permit access by the other device to a data network.

SUMMARY OF INVENTION

According to a first aspect of the present invention there is provided a method for tethering a communications device which is capable of providing access to a data network to a second device which requires access to the data network, the method comprising: configuring a WLAN subsystem of the communications device to act as a wireless station; and configuring a router subsystem of the communications device to route data received by the WLAN subsystem from the second device and intended for the data network to a cellular modem subsystem of the communications device, and to route data from the data network received by the cellular modem subsystem and intended for the second device to the WLAN subsystem.

The method may further comprise detecting, at the communications device, an identifier transmitted by the second device and, in response to detecting the identifier, configuring the router subsystem of the communications device to route data received by the WLAN subsystem from the second device and intended for the data network to a cellular modem subsystem of the communications device, and to route data from the data network received by the cellular modem subsystem and intended for the second device to the WLAN subsystem.

The identifier may be a service set identifier (SSID) or an information element (IE) transmitted by the second device, for example.

The identifier may be transmitted by the second device in response to a probe signal transmitted by the communications device.

Alternatively, the identifier may be included in a beacon signal that is periodically transmitted by the second device.

The detecting the identifier and the configuring the router subsystem may be performed by an application executing on the communications device The method may further comprise configuring a WLAN medium access control (MAC) layer of the second device to connect a link between the WLAN subsystem of the communications device and a WLAN subsystem of the second device directly to an Internet Protocol stack of the second device.

The method may further comprise detecting, at the second device, a signal transmitted by the communications device, and, in response to detecting the signal, configuring the WLAN MAC layer of the second device to connect a link between the WLAN subsystem of the communications device and a WLAN subsystem of the second device directly to an Internet Protocol stack of the second device.

The signal may be transmitted by the communications device in response to receiving at the communications device an identifier transmitted by the second device The second device may be operative to communicate with the communications device or with other devices connected to the second device in a WLAN frequency band.

For example, the WLAN frequency band may comprise a 5 GHz frequency band.

According to a second aspect of the invention there is provided a communications device for tethering to a second device to permit access by the second device to a data network, the communications device comprising: a WLAN subsystem by means of which the second device is able to connect to the communications device; a cellular modem subsystem for connecting the communications device to the data network; and a router subsystem for routing data between the WLAN subsystem and the cellular modem subsystem, wherein when the communications device is tethered to the second device the WLAN subsystem is configured to operate in a wireless station mode.

The communications device may further comprise means for detecting, at the communications device, an identifier transmitted by the second device and, in response to detecting the identifier, configuring the router subsystem of the communications device to route data received by the WLAN subsystem from the second device and intended for the data network to a cellular modem subsystem of the communications device, and to route data from the data network received by the cellular modem subsystem and intended for the second device to the WLAN subsystem.

The identifier may be a service set identifier (SSID) or an information element (IE) transmitted by the second device.

The identifier may be transmitted by the second device in response to a probe signal transmitted by the communications device, for example.

Alternatively, the identifier may be included in a beacon signal that is periodically transmitted by the second device.

The means for detecting the identifier and configuring the router subsystem may comprise an application executing on the communications device According to a third aspect of the invention there is provided a device for accessing a data network through a tethered communications device, the device comprising a WLAN MAC layer and a WLAN subsystem, wherein the WLAN medium access control (MAC) layer is configured to connect a link between a WLAN subsystem of the communications device and the WLAN subsystem of the device directly to an Internet Protocol stack of the device.

The device may further comprise means for detecting, at the device, a signal transmitted by the communications device, and, in response to detecting the signal, configuring the WLAN MAC layer of the device to connect the link between the WLAN subsystem of the communications device and the WLAN subsystem of the device directly to an Internet Protocol stack of the device.

The signal may be transmitted by the communications device in response to receiving at the communications device an identifier transmitted by the device.

The device may be operative to communicate with the communications device or with other devices connected to the device in a WLAN frequency band.

For example, the WLAN frequency band may comprise a 5 GHz frequency band.

The device may be a head unit of a vehicle, for example.

According to a fourth aspect of the invention there is provided a system for tethering a communications device which is capable of providing access to a data network to a second device which requires access to the data network, the system comprising a communications device according to the second aspect and a device according to the third aspect.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 4:
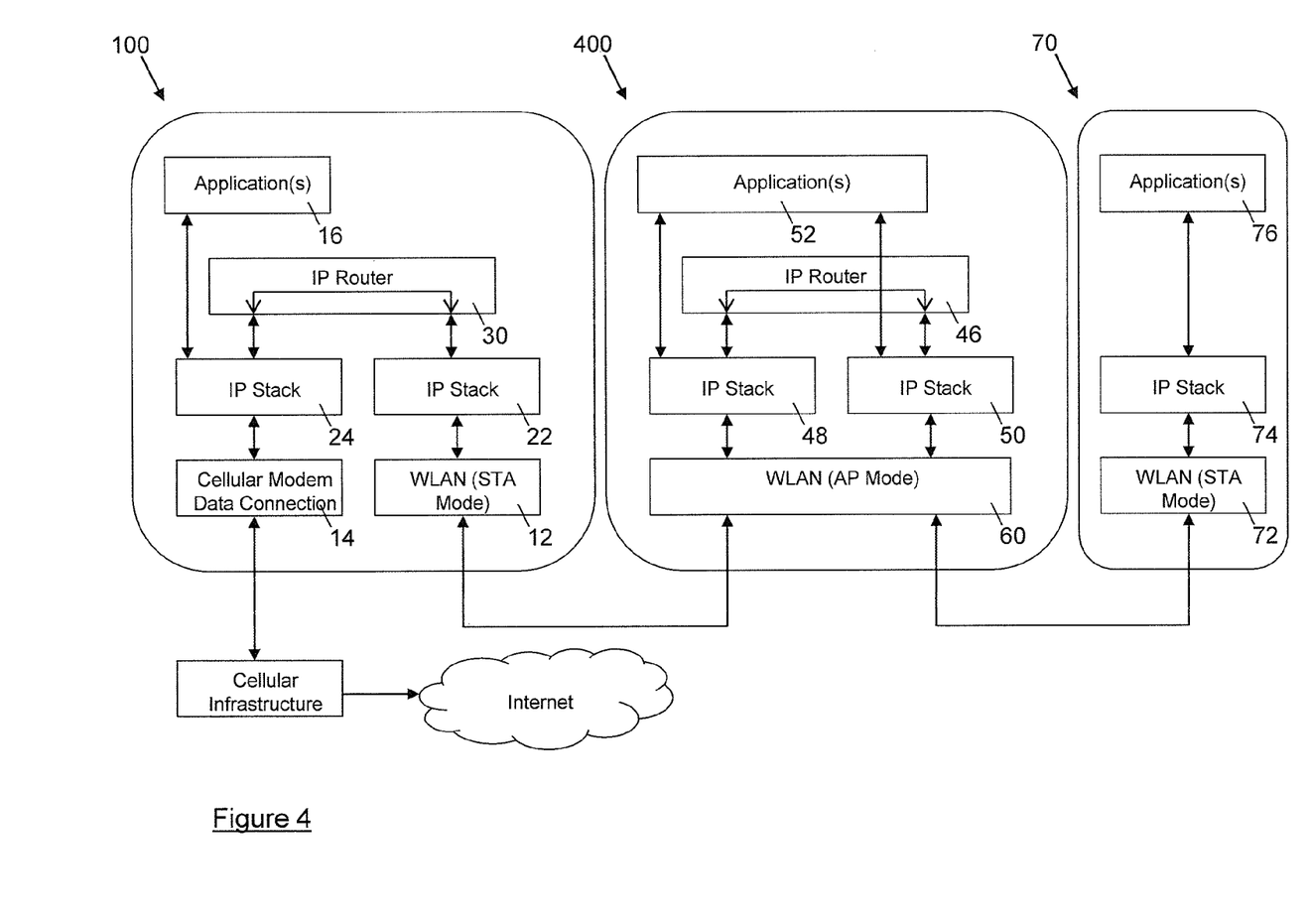
FIG. 4 is a schematic functional block diagram of a vehicle information and entertainment system tethered to a communications device in accordance with the present invention.

FIG. 4 is a schematic block diagram of a vehicle information and entertainment system tethered to a communications device using an improved tethering method. Many of the elements illustrated in FIG. 4 are similar to elements illustrated in FIG. 3 and discussed above, so like reference numerals have been used in FIGS. 3 and 4 to refer to like elements.

As in the system illustrated in FIG. 3, a device 100 such as a mobile telephone is tethered to a vehicle head unit 400 to provide connectivity via its cellular modem 14 to the head unit 400 and to other devices 70 that may be connected to the head unit 400.

However, in contrast to the system illustrated in FIG. 3, in which the WLAN subsystem 12 of the device 10 is configured to operate in AP mode to act as a wireless access point, in the system illustrated in FIG. 4 the WLAN subsystem 12 of the device 100 is configured to operate in STA mode, to act as a wireless station.

Additionally, in contrast to the system illustrated in FIG. 3, in which there are two separate WLAN subsystems 42, 44 in the head unit 40 (the first WLAN subsystem 42 configured to operate in STA mode to act as a wireless station and the second WLAN subsystem 44 configured to operate in AP mode to operate as a wireless access point), in the system illustrated in FIG. 4 the head unit 400 uses only a single WLAN subsystem 60, which is configured to operate in AP mode to act as a wireless access point. The operation of the system illustrated in FIG. 4 and the benefits of these differences will be described in detail below.

As indicated above and illustrated in FIG. 4, when tethered to the head unit 400, the WLAN subsystem 12 of the device 100 is configured to operate in its STA mode, to act as a wireless station. To achieve this change in the normal operation of its WLAN subsystem 12, the device 100 must be aware when it is to be tethered to the head unit 400. To this end, the device 100 may be provided with a software application (e.g. as part of the suite of applications 16 which are available to execute on the device 100) which, when executed, causes the device 100 to recognise the head unit 400 and automatically configure its WLAN subsystem 12 to operate in its STA mode (if necessary; the device 100 will normally be operating in STA mode if it is not tethered to another device) rather than switching to its AP mode.

For example, the software application may be operative to detect a particular SSID (Service Set Identifier) or Information Element (IE) transmitted by the head unit 400, which indicates or advertises that the head unit 400 is capable of operating, and configured to operate, in the manner described above. Alternatively, the head unit 400 may transmit some other identifier that can be detected by the device 100 and serves to indicate or advertise that the head unit 400 is capable of operating, and configured to operate, in the manner described above.

When the device 100 is within range of the head unit 400 it can detect this particular SSID, IE or other identifier, which may be transmitted by the head unit 400 in response to a probe signal transmitted by the device 100, or may be included in a beacon signal periodically transmitted by the head unit 400. On detection of the particular SSID, IE or other identifier, the software application of the device 100 will automatically configure the WLAN subsystem 12 of the device 100 to connect to the head unit 400 as normal (with the device 100 in STA mode).

In addition to configuring the WLAN subsystem 12 to connect, the software application must also configure the IP router 30 of the device 100 as shown in FIG. 4, to route IP data packets between the WLAN subsystem 12 and the cellular modem 14, via the IP stacks 22, 24. Thus, the software application of the device 100 may also be operative to configure the IP router 30 in this way on detection of the particular SSID, IE or other identifier.

The use of a particular SSID, IE or other identifier enables the software application to configure the device 100 for tethering to the head unit 400 with the appropriate configuration of the WLAN subsystem 12 and the IP router 30 without requiring the user to perform a manual tethering process of the kind described above, thereby reducing the user burden and safety implications of manually tethering the device 100 to the head unit 400.

In addition to the above-described changes in the normal operation of the device 100, the operation of the head unit 400 must also be altered in order to operate as shown in FIG. 4, as will now be described with reference to FIGS. 5 and 6.

Figure 5:
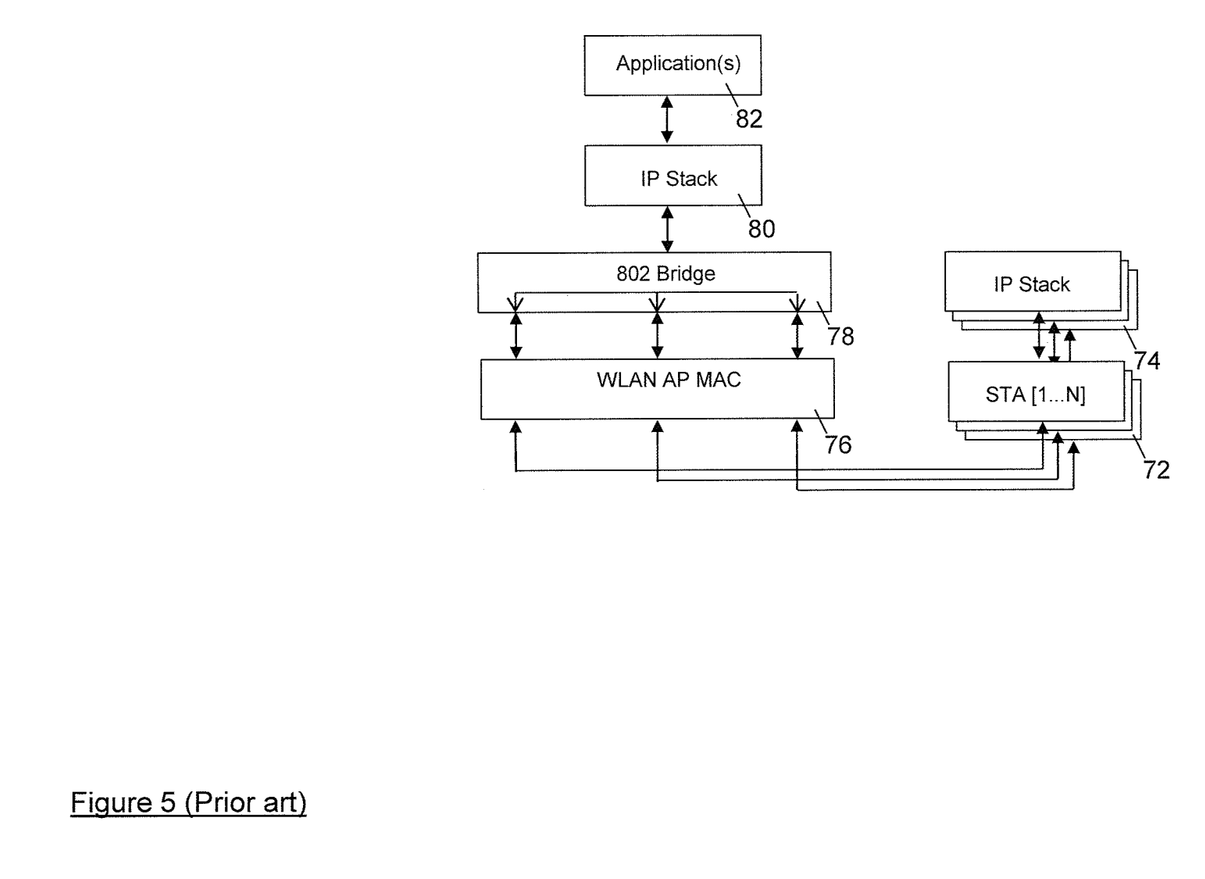
FIG. 5 is a schematic functional block diagram showing a typical wireless access point configuration.
Figure 6:
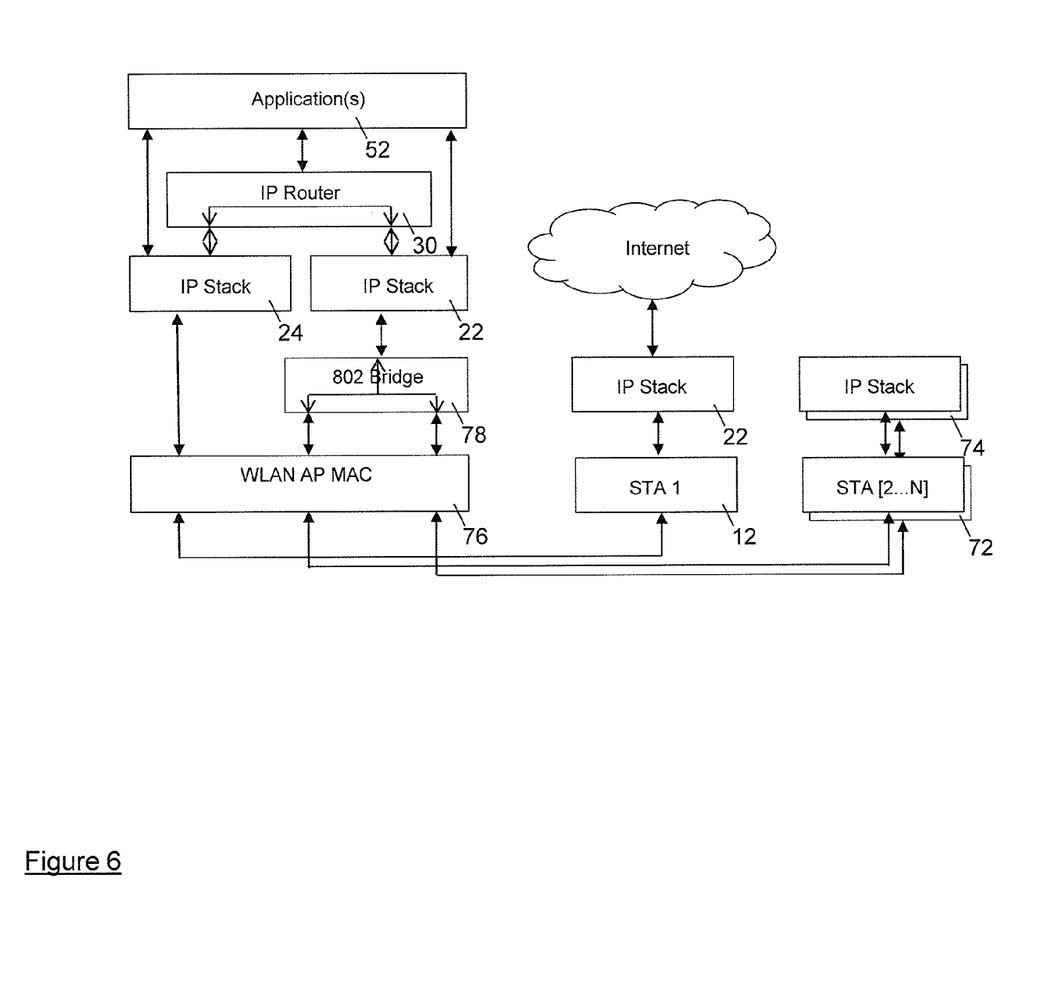
FIG. 6 is a schematic functional block diagram showing a modified wireless access point configuration.

FIG. 5 is a schematic functional block diagram showing a typical wireless access point configuration, which may be implemented, for example, in a head unit 40 of the kind illustrated in FIG. 3. The access point is connected to a number of wireless stations, such as devices 70

In a typical wireless access point configuration of the kind illustrated schematically in FIG. 5, a MAC (Medium Access Control) layer 76 of the WLAN subsystem connects to each wireless station to which the access point is connected. A WLAN subsystem 72 of each wireless station receives and transmits IP data packets via an IP stack 74, as is conventional. On the access point side, the MAC layer 76 receives and transmits IP data packets from and to a bridge 78, which bridges each wireless station connected to the wireless access point, at a protocol level (e.g. IEEE802.11), to an IP stack 80, which in turn receives and transmits IP data packets from and to applications 82 of the access point. In this way, data connectivity is established between the access point and each of the connected wireless stations.

The head unit 400 of FIG. 4 must operate somewhat differently than a typical access point of the kind illustrated in FIG. 5, as will now be described with referent to FIG. 6, which is a schematic functional block diagram showing a modified wireless access point configuration.

In particular, the head unit 400 must treat the link between its WLAN subsystem 60 (operating in access point mode) and the WLAN subsystem 12 of the device 100 (operating in station mode) as its primary IP gateway to the internet, providing IP data connectivity to the head unit 400 and to any other device 70 connected to the head unit 40. In order to achieve this, the link between the WLAN subsystem 60 of the head unit 400 and the WLAN subsystem 12 of the device 100 is not bridged at the protocol level by the bridge 78, as in the typical access point configuration illustrated in FIG. 5. Instead, in the modified configuration illustrated in FIG. 6, this particular link is accessible to the other devices 70 connected to the head unit 400 only at the IP level. Thus, the WLAN MAC layer 76 of the head unit 400 is configured to connect this particular link directly to the IP stack 24, bypassing the bridge 78. In this way, connectivity between the device 100 and the other devices 70 connected to the head unit 400 is established at the IP level only.

As indicated above, this modified configuration of the head unit 400 as an access point is not standard. However, the operation of the head unit 400 can be dynamically reconfigured by a software application executing on the head unit 400 where required. For example, a software application executing on the device 100 may cause the device 100 to transmit a signal to the head unit 400 to indicate that this modified configuration is required. This signal may be transmitted by the device 100 in response to detection by the device 100 of the particular SSID, IE or other identifier transmitted by the head unit 400 as described above.

The configuration of the head unit 400 to operate as an access point in this manner may simplify the design of the head unit and reduce cost, as the head unit can simultaneously connect to a tethered mobile device to provide data connectivity and communicate with other devices such as cameras, sensors and the like without requiring two separate WLAN subsystems. Additionally, this configuration also permits the head unit 400 to communicate wirelessly with the device 100 and/or with other devices 70 connected to the head unit 400 in the 5 GHz frequency band, rather than in the more congested 2.4 GHz band.

As described above, the configuration and reconfiguration of the operation of the device 100 and the head unit 400 may be implemented by software applications executing on the device 100 and the head unit 400. However, it will be understood by those skilled in the art that this configuration and reconfiguration of the device 100 and the head unit 400 could equally be implemented in firmware in the device 100 or the head unit 400 if appropriate, or could be implemented in hardware of either device.

Although the specific example described above uses a head unit 400 of a vehicle, the present invention is equally applicable to other applications in which data connectivity is provided to a second device via a first tethered device, for example a home gateway or router which uses a mobile device for connectivity rather than a fixed line connection.

The invention claimed is:

1. A method for tethering a communications device which is capable of operating in a wireless station mode and in an access point mode to provide access to a data network, the method comprising:
    detecting, at the communications device, an identifier of a second device;
    determining, based on the detected identifier, that the second device is a device recognized by the communications device as being configured in an access point mode;
    in response to determining that the second device is recognized by the communications device as being configured in the access point mode:
        configuring a wireless local area network (WLAN) subsystem of the communications device to operate in the wireless station mode, and
        configuring a router subsystem of the communications device to route data received by the WLAN subsystem from the second device and intended for the data network to a cellular modem subsystem of the communications device, and to route data from the data network received by the cellular modem subsystem and intended for the second device to the WLAN subsystem; and
    while operating in the wireless station mode, transmitting the data intended for the data network using the cellular modem subsystem, and transmitting the data intended for the second device using the WLAN subsystem.

2. A method according to claim 1 wherein the identifier is transmitted by the second device.

3. A method according to claim 2 wherein the identifier is a service set identifier (SSID) or an information element (IE) transmitted by the second device.

4. A method according to claim 3 wherein the identifier is transmitted by the second device in response to a probe signal transmitted by the communications device.

5. A method according to claim 3 wherein the identifier is included in a beacon signal that is periodically transmitted by the second device.

6. A method according to claim 2 wherein the detecting the identifier and the configuring the router subsystem are performed by an application executing on the communications device.

7. A method according to claim 1 further comprising configuring a WLAN medium access control (MAC) layer of the second device to connect a link between the WLAN subsystem of the communications device and a WLAN subsystem of the second device directly to an Internet Protocol stack of the second device.

8. A method according to claim 7 further comprising detecting, at the second device, a signal transmitted by the communications device, and, in response to detecting the signal, configuring the WLAN MAC layer of the second device to connect the link between the WLAN subsystem of the communications device and the WLAN subsystem of the second device directly to the Internet Protocol stack of the second device.

9. A method according to claim 8 wherein the signal is transmitted by the communications device in response to determining that the second device is the device recognized by the communications device.

10. A method according to claim 1 wherein the second device is operative to communicate with the communications device or with other devices connected to the second device in a WLAN frequency band.

11. A method according to claim 10 wherein the WLAN frequency band comprises a 5 GHz frequency band.

12. A communications device capable of operating in a wireless station mode and in an access point mode to provide to a data network, the communications device comprising:
    a wireless local area network (WLAN) subsystem by means of which a second device is able to connect to the communications device, wherein the WLAN subsystem is configured to detect an identifier of the second device and determine, based on the detected identifier, that the second device is recognized by the communications device as being configured in an access point mode;
    a cellular modem subsystem configured to connect the communications device to the data network; and
    a router subsystem configured to route data received by the WLAN subsystem from the second device and intended for the data network to the cellular modem subsystem, and to route data received from the data network by the cellular modem subsystem and intended for the second device to the WLAN subsystem,
    wherein responsive to determining that the second device is recognized by the communications device as being configured in the access point mode, the WLAN subsystem is configured to operate in the wireless station mode and,
    wherein while the communications device is operating in the wireless station mode, the cellular modem subsystem is configured to transmit the data intended for the data network, and the WLAN subsystem is configured to transmit the data intended for the second device.

13. A communications device according to claim 12, wherein the identifier is transmitted by the second device.

14. A communications device according to claim 13 wherein the identifier is a service set identifier (SSID) or an information element (IE) transmitted by the second device.

15. A communications device according to claim 14 wherein the identifier is transmitted by the second device in response to a probe signal transmitted by the communications device.

16. A communications device according to claim 14 wherein the identifier is included in a beacon signal that is periodically transmitted by the second device.

17. A communications device according to claim 13 further comprising an application executing on the communications device and configured to detect the identifier and configure the router subsystem.

18. A system comprising the communications device according to claim 12 and the second device according to claim 12, wherein the second device comprises a wireless local area network (WLAN) medium access control (MAC) layer and a WLAN subsystem, wherein the WLAN MAC layer is configured to connect a link between the WLAN subsystem of the communications device and the WLAN subsystem of the second device directly to an Internet Protocol stack of the second device.

19. The system according to claim 18 wherein the communications device is configured to transmit a signal to the second device indicating that the communications device is operating in the wireless station mode and wherein the WLAN MAC layer of the second device is configured to, upon receiving the signal indicating that the communications device is operating in the wireless station mode, connect the link between the WLAN subsystem of the communications device and the WLAN subsystem of the device directly to the Internet Protocol stack of the second device.

20. A system according to claim 19 wherein the signal is transmitted by the communications device in response to receiving at the tethered communications device an identifier transmitted by the second device.

21. A system according to claim 19 wherein the second device is operative to communicate with the tethered communications device or with other devices connected to the device in a WLAN frequency band.

22. A system according to claim 21 wherein the WLAN frequency band comprises a 5 GHz frequency band.

23. A system according to claim 19 wherein the second device is a head unit of a vehicle.

\* \* \* \* \*